United States Patent [19]

Forster et al.

[11] 3,779,892

[45] Dec. 18, 1973

[54] ELECTRONIC MEASUREMENT OF END POINT OF ASPHALT OXIDATION

[75] Inventors: Eric O. Forster, Scotch Plains; Alan D. Goldshine, West Orange; Albert Gathman, Belmar, all of N.J.

[73] Assignee: Esso Research and Engineering Company, Linden, N.J.

[22] Filed: July 12, 1972

[21] Appl. No.: 271,036

Related U.S. Application Data

[63] Continuation of Ser. No. 9,486, Feb. 9, 1970.

[52] U.S. Cl.......................... 208/6, 208/39, 208/44, 23/230 A, 324/258
[51] Int. Cl.............................................. C10g 1/00
[58] Field of Search........................... 208/6, 44, 39; 23/230 A

[56] References Cited
UNITED STATES PATENTS

| | | | |
|---|---|---|---|
| 2,099,434 | 11/1937 | Culbertson, Jr. | 208/6 |
| 2,317,150 | 4/1943 | Lovell et al. | 208/6 |
| 3,090,223 | 5/1963 | Juffa et al. | 208/DIG. 1 |
| 3,462,364 | 8/1969 | Carlson | 23/230 A |
| 3,540,868 | 11/1970 | Chevion | 23/230 A |

Primary Examiner—Delbert E. Gantz
Assistant Examiner—Veronica O'Keefe
Attorney—Donald F. Wohlers

[57] ABSTRACT

An electronic measuring technique for use in determining the end point of a process, such as an air blowing process employed in the manufacture of asphalt by means of an electronic bridge circuit, a device for monitoring continuously certain electrical properties of the actual product, and a reference standard which simulates the preselected desired electrical properties of the product, such as oxidized asphalt, being manufactured. As the process progresses the difference between the sensed electrical properties of the actual product and those simulated by the reference standard decreases and becomes zero or nearly zero at the end point. When the difference is zero, provision is made for the process to be stopped automatically or manually, whereupon the product is transferred to its respective storage area.

2 Claims, 3 Drawing Figures

PATENTED DEC 18 1973

INVENTORS
ERIC O. FORSTER
ALAN D. GOLDSHINE
BY ALBERT GATHMAN

ATTORNEY

Fig. 2.

ELECTRONIC MEASUREMENT OF END POINT OF ASPHALT OXIDATION

This is a continuation, of application Ser. No. 9,486 filed Feb. 9, 1970.

BACKGROUND OF THE INVENTION

The present invention relates to a system wherein certain preselected characteristics of a product being manufactured are continuously monitored and compared with a reference standard simulating desired characteristics of the product, whereby when the difference between the actual product characteristics and the reference standard is substantially zero, this is shown on a readout device, thus making the operator aware that the desired end point has been attained and the process may be stopped for transfer of the product to a storage area or the like. More particularly, the present invention is concerned with a novel and improved electronic measuring system for determining the end point in a process employed in the manufacture of a product by means of an electronic device which comprises a sensor, such as a test cell, mounted in the tank or tower containing the product and in contact therewith, a reference standard for simulating certain preselected electrical properties of the product and an electronic bridge with a readout display for comparing the characteristics of the actual product and those of the reference standard thereby to provide an indication as to when the desired product characteristics, or in other words the process end point, have been obtained.

Although the present invention will be described with regard to a preferred embodiment involving asphalt oxidation, it will be apparent to those skilled in the art that the invention generally is applicable to other plant operations. Heretofore the duration of the air blowing process used to produce oxidized asphalt has been based on a semi-empirical relation between the length of time air is blown and the softening point. Generally, the operation requires that air be blown through the asphalt at a temperature of 480° to 500°F. for about six hours to achieve an asphalt grade having a softening point ranging from 190° to 200°F. (commonly known as 180-ox), or eight hours for an asphalt grade having a softening point range from 220° to 230°F. (commonly known as 220-ox). At the end of the period required for the respective grades the air flow is stopped and a laboratory inspection sample is removed. The asphalt then is kept at 480° to 500°F. until the laboratory reports its findings some two hours later. If the softening point is found to be too low, air blowing is resumed for a relatively short period of time. If, on the other hand, it is too high, the asphalt is pumped into a storage tank for reblending. The foregoing procedure has proven to be quite unsatisfactory because not only is product quality control very poor—in fact, inspection of the finished products has revealed that only 40 to 50 percent of them are within the specified limit—but the tower capacity is reduced by necessitating the holding of the product while awaiting inspection results. Further, the delay is objectionable in terms of product quality, since it has been found that even without air flow the viscosity and hence the softening point of the oxidized asphalt may increase during this waiting period. The term "softening point" as used in this specification is intended to mean that the temperature at which the asphalt contained within the confines of a ring can no longer support the weight of a steel ball of a diameter smaller than the inner diameter of the ring. For a further detailed description of a method commonly employed in determining the softening point, reference should be made to ASTM Method D36-66T.

Depending on the extent of the air blowing process, it is possible to produce materials having desired softening points ranging from below 100° to over 230°F. The higher the softening point range the greater is the duration of air blowing required and thus, the time required for the product to remain in the tower is greatly increased and the total throughput, particularly during peak seasons, is reduced considerably.

Various attempts have been made to find a satisfactory way to increase the capacity of the plant. To provide an additional tower is not very attractive because the plant capacity is exceeded only during periods of peak demand. Another possibility is to blend one batch of the product having a softening point that is too high with another batch having a correspondingly lower softening point. By blending the two in a storage tank, it is hoped that the final product will be within the established specification and while this approach might yield an acceptable softening point, other physical characteristics have been found to be adversely affected. Also, since the residence time of the off-specification batch in the storage tank might be very short, it is quite possible that it may be passed on to customers before blending could take place. Thus, it is apparent from the foregoing unsuccessful prior art attempts to increase plant capacity and product quality, that a new technique is required to overcome the failures and difficulties encountered, and simultaneously to provide for close product quality control and with an increase in plant capacity by eliminating the lengthy waiting time for laboratory evaluation of the various samples.

SUMMARY OF THE INVENTION

The present invention overcomes both these and other prior art deficiencies by providing a novel and an improved system for continuously monitoring certain predetermined characteristics of a product and comparing these characteristics with those simulated by a reference standard by employing an electronic measuring system. Before going into the various details of the specific system contemplated by the present invention, it may be well to go into the theoretical background of the present invention.

When a material is subjected to an alternating electrical field, its response to the field can be described phenomenologically in terms of a capacitor and a resistor connected either in series or parallel relation. The capacitor represents the material's ability to store electrical energy reversibly, while the resistor indicates the irreversible dissipation of electrical energy.

In a system of polar molecules, an alternating electrical field will cause displacements of the molecules from their equilibrium position as they try to orient themselves with respect to the field. This motion is opposed by the environment in which the molecule moves. The environmental effects may come from interaction of the dipoles themselves or from interactions of the dipoles with other molecules. In either case the net effect will be a slowdown of the motion of the polar molecules preventing them from moving in phase with the applied field. The resistance of the medium represents the microscopic viscosity existing in the vicinity of the dipoles. It has been recognized that the electrical resistivity of its inverse, the electrical conductivity, of a suspension of polar molecules in a nonpolar environment is directly related to viscosity of the system. It is therefore possible to correlate changes in the electrical resistivity or conductivity of a system to its internal or microscopic viscosity, provided the frequency of the alternating field is less or smaller than the natural vibrational frequency of the polar molecules.

In the case of an asphalt air blowing process, it is important to note that once on temperature and at a preselected frequency of 1KHZ the resistance of the asphalt increases as air blowing progresses, while the capacitance and hence, the dielectric constant of the asphalt remains essentially constant. This confirms that the increased viscosity of the air blown asphalt is not due to oxidation of its constituents, but is due to polymerization. For the purposes of this invention and for reasons obvious to those skilled in the art, frequencies ranging from $10^1$ to $10^7$ HZ can be used, although frequencies of $10^2$ to $10^6$ HZ are preferred and frequencies between 500 and 50,000 HZ are most preferred.

Thus, it is seen that a material can be phenomenologically described as a combination of a capacitor and a resistance, provided, of course, that the appropriate capacitance and resistance values are known at a preselected frequency, for example 1KHZ. By ascribing characteristic capacitance and resistance values to the two grades of asphalt (180-ox and 220-ox), under consideration in regard to the preferred embodiment, it is possible to compare the electrical characteristics of an actual system undergoing air blowing with the predetermined desired final electrical equivalent. In this manner the extent of difference between the two values indicates how far off the actual material's properties are from those of the desired finished product. To carry out the foregoing comparison on a continuous basis, the present invention contemplates employing a monitoring system using a bridge circuit capable of determining independently the unbalance of both the capacitive and the resistive component. Although the resistance comparison is the prime consideration in this case, the capacitance reading is useful in those instances involving chemical changes occurring during processing.

More specifically, the present invention contemplates continuously monitoring the electrical properties of the material by means of a conductivity sensing test cell. The sensed electrical properties of the actual material are compared electrically with a reference standard comprising a combination resistor-capacitor network. Also, the reference standard may comprise a sample of the finished product provided that the product material is stable under the prevailing physical conditions and its electrical properties remain constant with time. The test cell and the reference standard are connected in an impedance bridge configuration. A master oscillator and phasing system provide excitation of the bridge at the desired frequency. Bridge unbalance is sensed by a preamplifier whose output is fed to a demodulation or phase detecting section. There the output signal is compared with the original excitation signal, and is resolved into a resistive and a reactive component. This comparison is performed by means of phase sensitive detectors whose outputs are used to drive the final displays or readout devices. The bridge excitation is accomplished by feeding the oscillator signal to an inverting amplifier and a noninverting amplifier, which provide out-of-phase and in-phase bridge excitation respectively. Since normally the test cell is located remotely from the reference standard, interconnecting coaxial cables are used wherever necessary. The foregoing described system of the present invention has distinct advantages over the prior art in that it is low in cost by virtue of the fact that it uses commercially available items, for example, the test cell; it is adaptable for use in multiple tank or tower operations; it is simple in that operator adjustments are minimal; it is weatherproof and provides a readily ascertainable null meter readout; it is serviceable since it is of a modular construction and employs solid state devices and integrated circuits where possible; and it is safe in that low voltages are used and is readily adaptable to explosion-proof constructions. A further significant advantage of the present system is that the control signals produced thereby are available for purposes of automation, if desired.

Accordingly, it is a primary object of the present invention to provide a novel and improved system and method for determining by means of a measuring technique when the desired end point of a particular material or reaction has been obtained.

Another object of this invention is to provide a novel and improved system and method for continuously monitoring by electronic means the difference between selected characteristics of an actual material and predetermined desired characteristics thereof, thereby to provide an indication as to when the material has attained the desired final characteristics.

A further object of this invention is to provide a novel and improved electronic measuring system for monitoring continuously and automatically the progress of a process employed in the manufacture of a product.

Still yet a further object of the present invention is to provide a novel and improved technique for electronically determining the end point of a material and which employs an electronic comparing circuit and an electric reference standard which simulates the desired end point electrical properties of the product to be produced at a given frequency.

Having in mind the above and other objects that will be evident from an understanding of this disclosure, the invention comprises the devices, combinations and arrangements of parts as illustrated in the presently preferred embodiment of the invention which is set forth in such detail as to enable those skilled in the art readily to understand the function, operation, construction, and advantages of it when read in conjunction with the accompanying drawings in which:

BRIEF DESCRIPTION OF THE DRAWINGS

FIG. 3 is a schematic wiring diagram of the schematic of FIG. 2 showing the details of the present invention.

DESCRIPTION OF A PREFERRED EMBODIMENT

Figure 1:
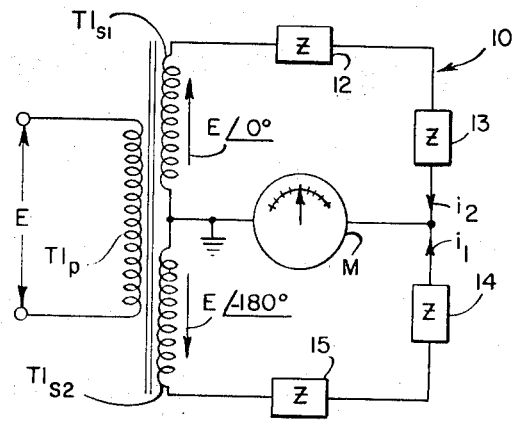
FIG. 1 is a schematic representation of the present invention, in its broadest sense, connected in a bridge circuit configuration.

In FIG. 1 there is disclosed a conventional bridge circuit configuration, generally denoted 10, of the half-bridge type whose operation now will be described having reference to the present invention. The bridge 10 comprises an input excitation transformer T1 having a primary winding $T1_p$ and a pair of split phase secondary windings $T1_{s1}$ and $T2_{s2}$ having a common grounded terminal 11. Each of the secondary windings $T1_{s1}$ and $T1_{s2}$ are connected in one-half of the bridge circuit in series with impedances 12 and 13, and impedances 14 and 15, respectively, and a common line 16 connecting a readout display such as a null meter M between common ground 11 and common terminal 17. An excitation voltage signal E is applied to the primary winding $T1_p$ and appears across the secondary windings as equal and opposite voltages, that is across the upper secondary winding $T1_{s1}$ there appears a voltage signal E having a phase angle of 0°, and across the lower secondary winding $T1_{s2}$ there appears a voltage signal E having a phase angle of —180°. This input voltage is controlled and therefore can be considered as stable. Thus, there is formed a pair of commonly connected symmetrical circuits. The signal $E \angle 0°$ generates a current $i_2$ which represents certain characteristics of the actual material being sampled by the test cell. The signal $E \angle -180°$ generates a current $i_1$ which represents predetermined simulated characteristics of the desired end product. These signals flow from each circuit through the common line 16 where they add vectorially and depending upon the phase angle relationship between the respective signals, the meter M will provide a readout representative of this summation. The readout will permit determination as to whether the desired end point has been obtained. A zero or null reading will occur when the absolute values are identical and the phase angles thereof are such that the vector summation is zero. If the phase angle of the signal representative of the sampled material, which angle is determined by the ratio of resistive to reactive component, differs from that of the reference standard, then a readout other than zero will appear and the operator is aware that further processing is required.

Figure 2:
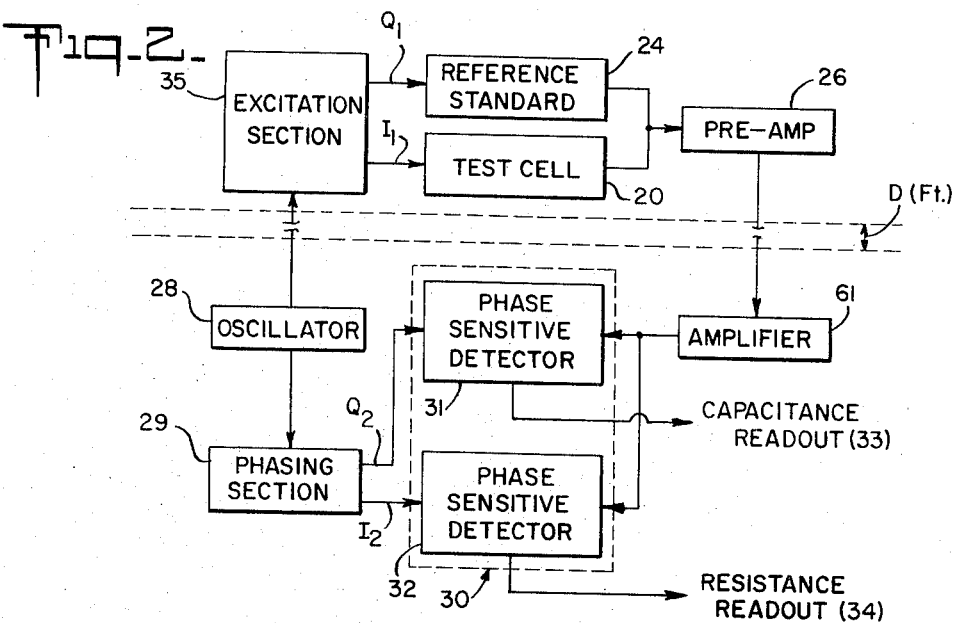
FIG. 2 is a schematic block diagram showing a preferred embodiment of this invention.

FIG. 2 illustrates a block diagram of the system according to the present invention while FIG. 3 illustrates specific details thereof. The electrical properties of the sample material under test are monitored by a device such as a conductivity cell generally indicated as 20. The cell equivalent is shown in FIG. 3 by parallel capacitor 21-resistor 22 network. Preferably the test cell comprises a plurality of capacitor-resistor (21-22; 21'-22', etc.) networks each of which has a different value corresponding to the desired grade of asphalt. A switch 27 may be provided to permit the operator to select the appropriate capacitor-resistor combination corresponding to the desired grade to be sampled. For example, to monitor separately the production of two grades (180-ox and 220-ox) of oxidized asphalt, the desired softening point specifications for these two products and their corresponding typical electrical specifications at 1KHZ are as follows:

| Product Grade | Softening Point Range °F | Resistance Range, Megohms | Capacitance PF |
|---|---|---|---|
| 180-ox | 190–200 | 1.55–1.70 (R25) | 50±1 (C26) |
| 220-ox | 220–230 | 2.70–2.80 (R25') | 50±1 (C26') |

To accurately define the desired physical characteristics of the finished product, it is important that a reliable laboratory test, such as ASTM Method D36-66T be employed in measuring the desired softening point for this purpose. The reference standard 24, which simulates electrically the desired physical characteristics of the finished product, comprises a combination of a parallel connected resistor 25 and a capacitor 26. The standard 24 in turn is connected in parallel with the test cell 20 to form in effect an impedance bridge configuration. As shown in FIG. 3, the standard 24 may comprise a plurality of resistor-capacitor networks (25-26; 25'-26', etc.) each of which corresponds to a different grade of asphalt. A switch 23 is provided for selection by the operator of the particular tower being tested.

A master oscillator 28 and a phasing section 29 provide excitation for the bridge. Any bridge unbalance is sensed by a preamplifier 26 and is transmitted to a demodulation section generally indicates as 30 comprising a pair of phase sensitive detectors 31 and 32 whose operation is well known and does not per se form part of this invention. The sensed signal output of the preamplifier 26, which contains resistive and reactive components, is compared with corresponding components of the original excitation signal supplied to the phase sensitive detectors 31 and 32 from the phasing section 29 which receives the oscillator output signal. The comparison is performed by the phase sensitive detectors 31 and 32 whose outputs, as indicated in FIGS. 2 and 3 are used to drive the final displays or, in other words, to provide a meter readout 33 for the capacitance and a meter readout 34 for the resistance. The capacitance is indicative of dielectric constant, while the resistance, which is the more significant readout, is indicative of viscosity. If desired, the capacitance readout 33 may be eliminated.

Physically, the electronic system is divided into two separate units referred to as the measurement section and the readout section. The measurement section is located outdoors near the tanks or towers (not shown) housing the asphalt or other material undergoing manufacture. These units, as shown in FIG. 2, may be separated by quite some distance D, for example, 200 feet.

The excitation circuit 35 comprises the amplifiers 36 and 37 which are of conventional solid state design. The incoming signal supplied by the master oscillator 28 is fed to the inverting amplifier 36 and the noninverting amplifier 37. These two amplifier circuits provide out-of-phase ($Q_1$) and in-phase ($I_1$) bridge excitation, respectively. Each amplifier may comprise a plurality of stages; however, the output stage of each of these amplifiers preferably is connected in voltage follower or common collector configuration to provide a low impedance drive for the bridge. Also, the configuration of each channel is balanced to provide a minimum of undesired signal quadrature, that is, unwanted 90° components. These signals $Q_1$ and $I_1$ are coupled to the reference standard 24 and the test cell 20 by means of coaxial cables 38 and 39, respectively. This arrangement allows the sampling test cell and the reference standard to be located remotely from the excitation section 35. Although the coaxial cables 38 and 39 may be of any reasonable length, it is important that cable balance be maintained in the bridge legs and thus, equal lengths of the same type of cable are essential in connecting the cell 20 and the reference standard 24 to the excitation section.

The preamplifier 26 functions as a bridge detector and may comprise amplifiers 40 and 41, which preferably are arranged in a current sensing operational configuration. This configuration is designed to function so that it provides stable current amplification. Any bridge unbalance current flows into the input terminal 42 where it sees the operationally developed virtual ground. The output voltage of the preamplifier 26 then will comprise the product of the sensed bridge unbalance current times the value of the feedback resistor 43. The amplifier 40 is an electrometer that is, it has a high input impedance input device connected in an inverting mode while the amplifier 41 is a noninverting fixed gain device that is used to increase the overall loop gain at the operating frequency. This arrangement provides for an extremely stable sensitive bridge detector. As shown in FIG. 3 the reference standard 24 and the test cell 20 are connected by means of coaxial cables 44 and 45 and 46 to the input terminal 42 of the preamplifier 26. As mentioned heretofore in regard to the input coaxial cables 38 and 39, the output coaxial cables 44 and 45 should be of equal lengths and of the same type of cable in order to provide a properly balanced system.

The readout section comprises the oscillator 28 which has excellent frequency stability and purity of wave form and operates at about 1KHZ. The oscillator per se is conventional. To provide greater sensitivity selection the oscillator output may be selectively fed to a suitable attenuator network provided with a switch to select either high or low sensitivity. Although not shown, a voltage follower (common collector transistor configuration) may be provided at the output of the oscillator 28 for purposes of line driving and impedance isolation. Such configurations are characterized by high input impedance and low output impedance, thereby to provide the desired isolation.

The oscillator signal also is fed to a transformer 46 in the phasing section 29 for use as the chassis reference signal. The primary of the transformer 46 comprises a pair of series connected windings 47 and 48 connected to ground 49. The secondary of the transformer 46 comprises a single grounded winding 50 and a pair of windings 51 and 52 grounded at their common junction 53. The transformer 46 is constructed so that the single winding 50 provides a direct singal without any phase shift. The secondary windings 51 and 52 are connected in series relation with phase shifting network comprising a variable resistor 54 and a capacitor 55, which by proper adjustment of the resistor 54, provides a 90° phase shift of the reference signal applied thereto. The latter signal is shown as $Q_2$ in FIG. 3, while the non-phase shifted signal is shown by $I_2$. A pair of power amplifiers 56 and 57 are connected in the lines containing the signals $I_2$ and $Q_2$, respectively, to provide the necessary amplification required to drive the reference input phase detector transformers 58 and 59. Each transformer preferably comprises a pair of center tapped primary windings and a pair of center tapped secondary windings. The detected bridge unbalance signal obtained from the preamplifier output terminal 60 is processed by an amplifier 61. This amplifier 61 provides a relatively small gain, but more important, it compensates for fixed phase shifts that may occur in the system. the amplifier 61 may comprise one or more stages, and also may include a power amplifier stage if deemed necessary, to provide an input drive signal to the signal input transformer 62 of the phase sensitive detectors 31 and 32. The primary of transformer 62 comprises a pair of windings 63 and 64 grounded at their common junction 65. The secondary comprises pairs of center tapped windings 66–67 and 68–69. The phase detectors operate in substantially conventional fashion by comparing the input signal phase with the corresponding phase of a reference excitation. The capacitance readout meter 33 is connected between the center tapped secondaries of transformers 58 and 62 (66–67) and the resistive readout meter 34 is connected between the center tapped secondaries of transformers 59 and 62 (68–69). Each meter 33,34 has a variable resistor 70,71, respectively, connected in series relation therewith for providing a sensitivity adjustment. The outputs of the phase detectors 31 and 32 are bipolar DC signals which drive the readout devices which comprise DC microammeters 33 and 34, respectively. Since bridge balance is represented by zero output on each channel, zero center or a null reading are normally used for purposes of readout. Thus, the operator readily can determine whether the actual product meets the desired characteristics of the final product.

The foregoing described electronic measuring system achieves its purpose of eliminating the waiting period for analytical results, and, at the same time, it insures much better product quality because the operator does not have to depend on arbitrary time limits for the various operating times required to produce the finished product. Thus, by monitoring the readout meters 33 and 34 (although 34 alone is sufficient), the operator readily can determine when the product is finished and ready for transfer from the tower to the storage area or the consumer.

While the present system has been described with specific reference to asphalt oxidization, it is within the scope of this invention to extend its usage to other areas such as the control of water content of alcohols, esters and ethers; the control of the quality of solvents such as isoparaffins; the control of oil content in waxes; and zinc dialkyl dithiophosphate manufacture having an end point in neutralization of the corresponding acid with zinc oxide, etc.

Further, it is within the scope of this invention to employ solid state devices, such as transistors, diodes, etc., wherever possible and also, to use integrated circuits where available with the desired characteristics. Although not specifically disclosed, it is within the scope of those skilled in the art to provide suitable conventional power supply where necessary.

It will be understood that various changes in the details, materials, arrangements of parts, and operating conditions which have been herein described and illustrated in order to explain the nature of this invention may be made by those skilled in the art within the principal scope of the invention as expressed in the claims.

Having thus set forth the nature of the invention, what we claim herein is as follows:

1. An improved process for the oxidation of asphalt comprising the steps of (1) maintaining the asphalt in a molten condition at an elevated temperature, (2) blowing air through said molten asphalt, (3) measuring the electrical resistance characteristic of the asphalt as it is being oxidized, (4) comparing the measured electrical resistance characteristic of the asphalt with a predetermined standard, and (5) terminating said blowing of air when said measured electrical resistance characteristic substantially corresponds to said predetermined standard.

2. The process according to claim 1, wherein the measured electrical resistance characteristic of the asphalt corresponds to viscosity of the asphalt.

* * * * *